Figure 8:
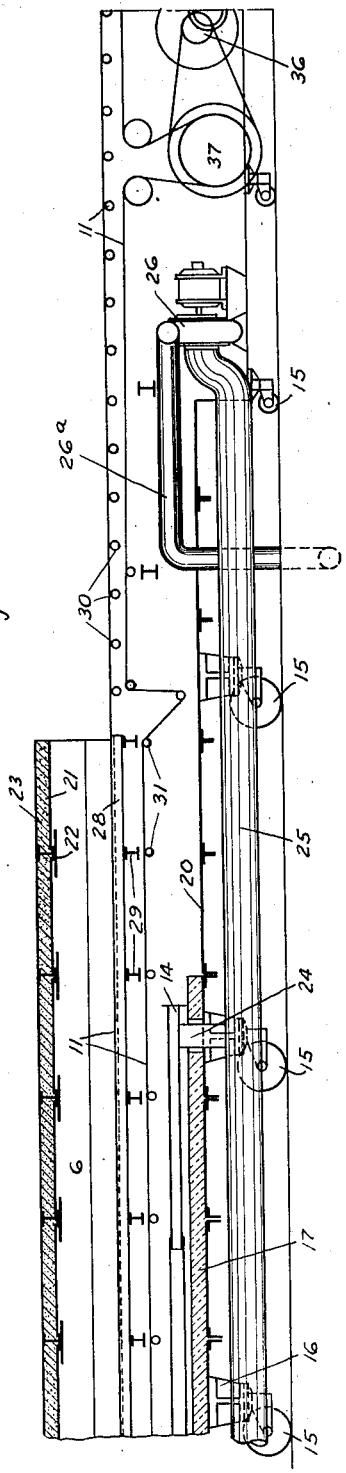

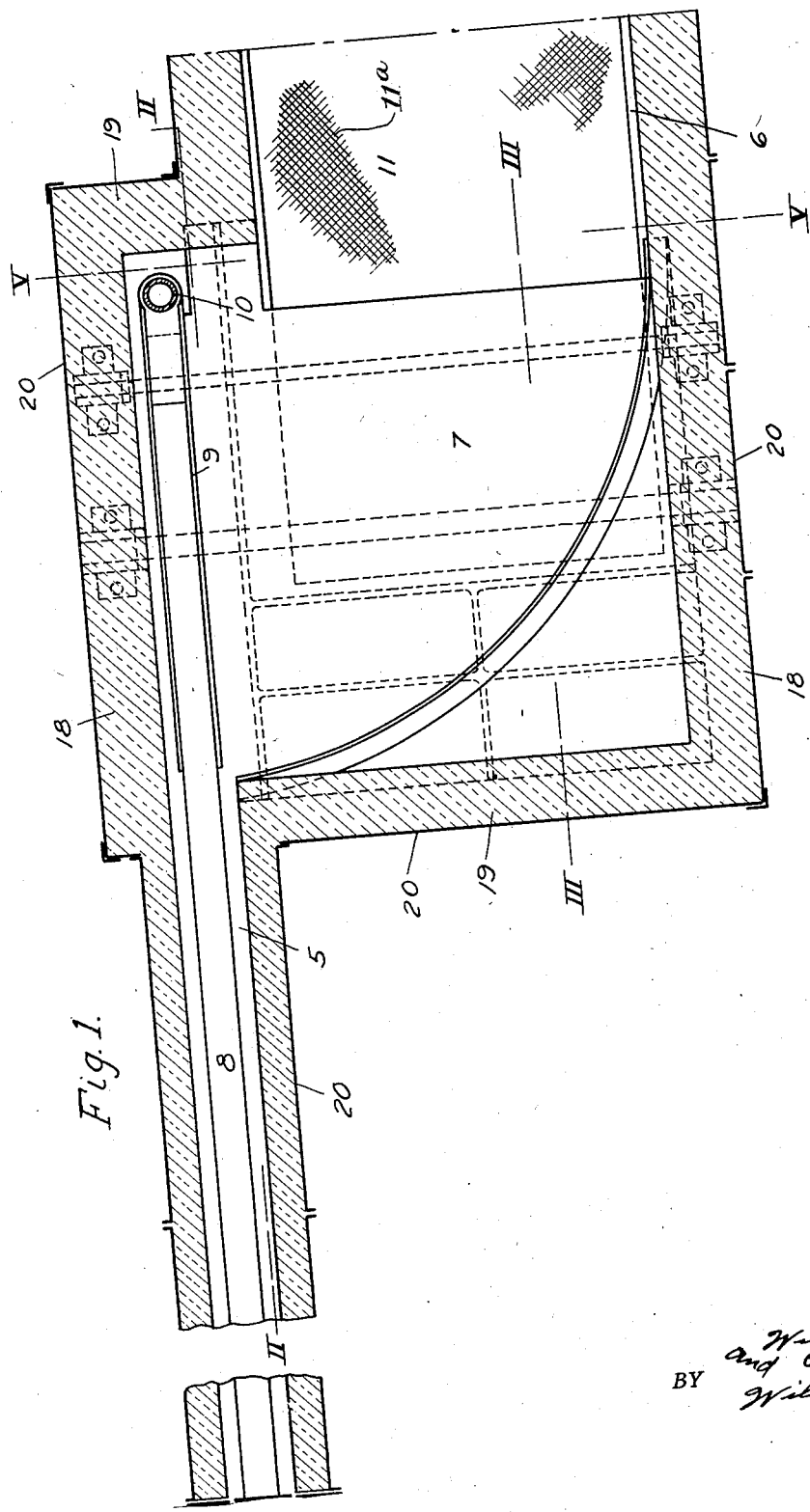

Nov. 27, 1934.   W. A. MORTON ET AL   1,982,477
APPARATUS FOR ANNEALING GLASSWARE
Filed May 4, 1934   6 Sheets-Sheet 2
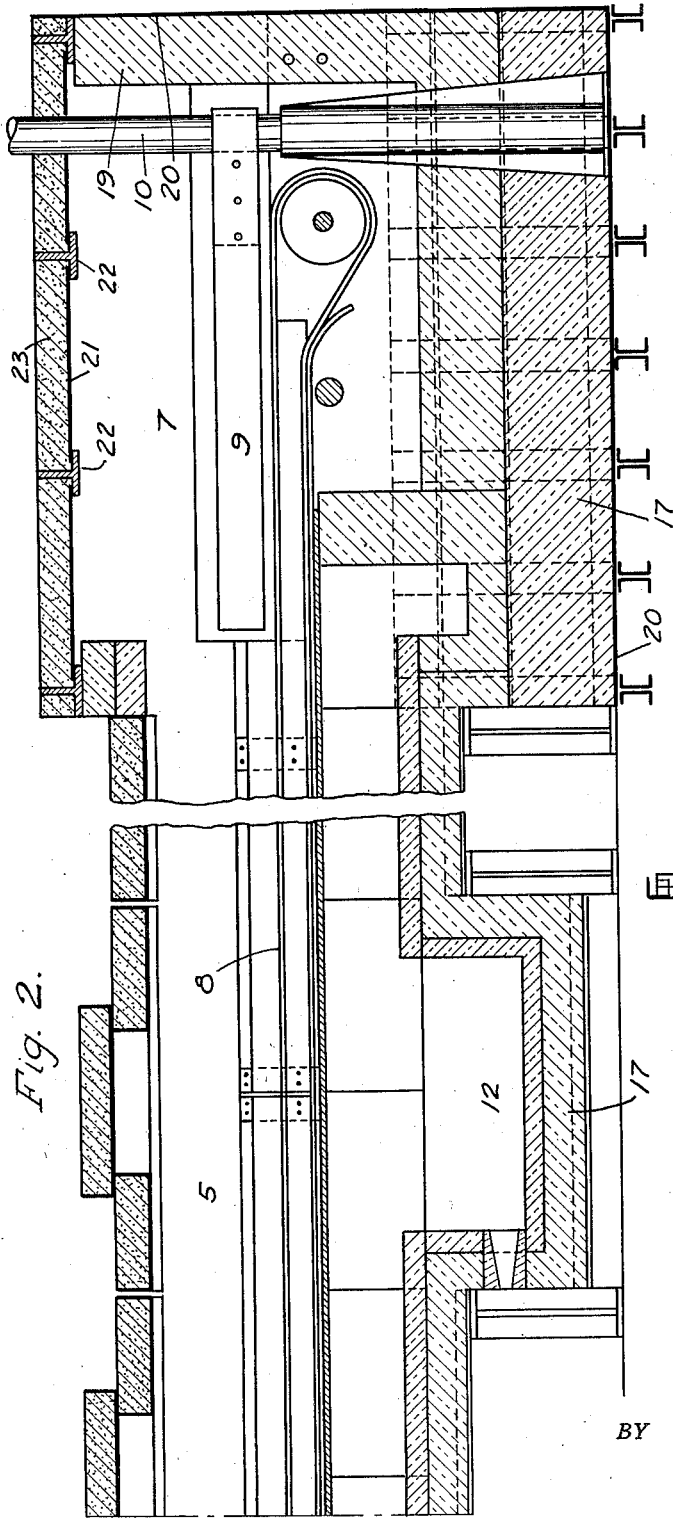
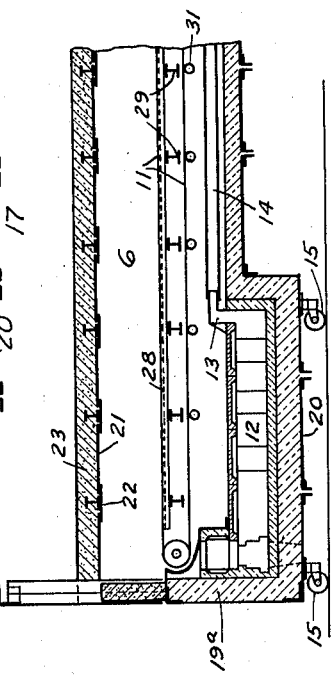
INVENTORS
William A. Morton
Paul L. Geer
BY William B. Jasport
ATTORNEY Nov. 27, 1934.　　　W. A. MORTON ET AL　　　1,982,477
APPARATUS FOR ANNEALING GLASSWARE
Filed May 4, 1934　　　6 Sheets-Sheet 3
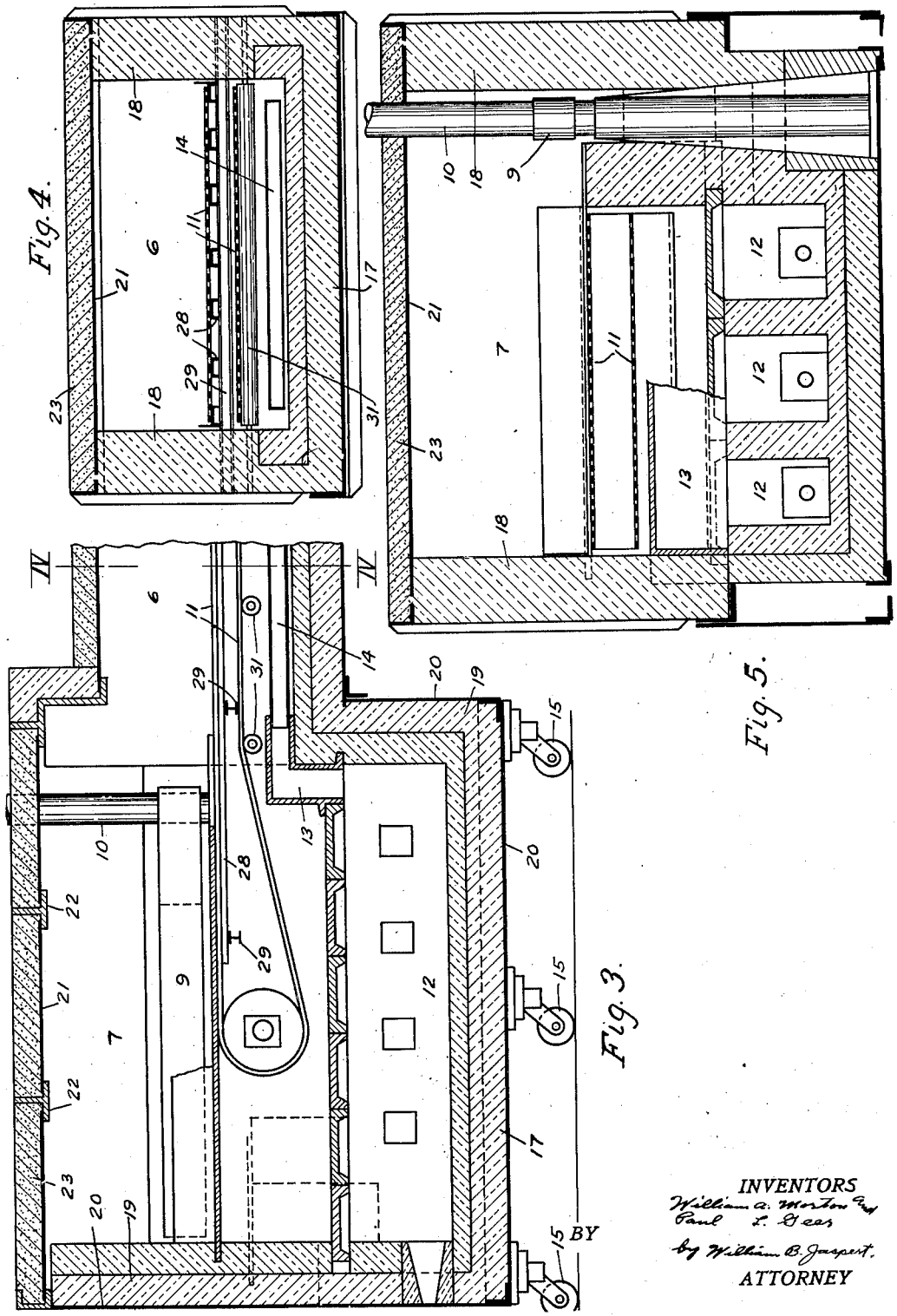
INVENTORS
William A. Morton
Paul L. Dees
BY William B. Jaspert
ATTORNEY

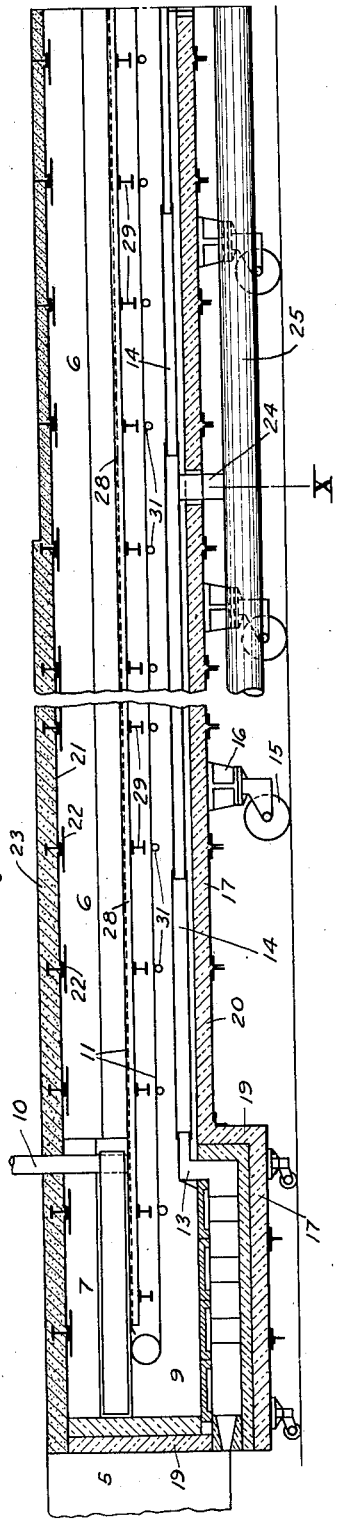
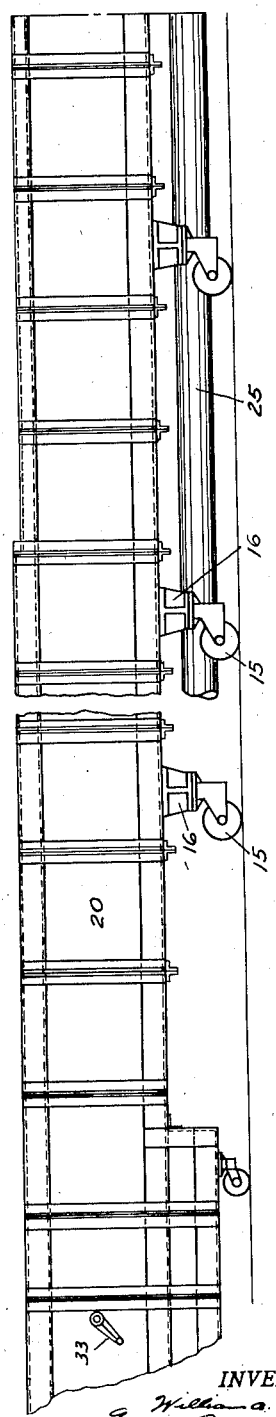

Nov. 27, 1934.    W. A. MORTON ET AL    1,982,477
APPARATUS FOR ANNEALING GLASSWARE
Filed May 4, 1934    6 Sheets-Sheet 5

INVENTORS
William A. Morton
and Paul L. Geer
BY William D. Jaspert
ATTORNEY

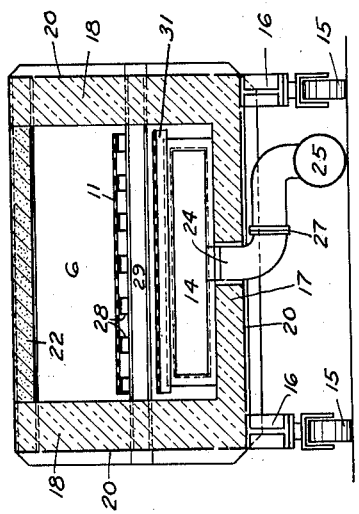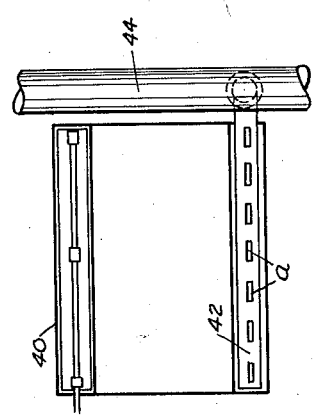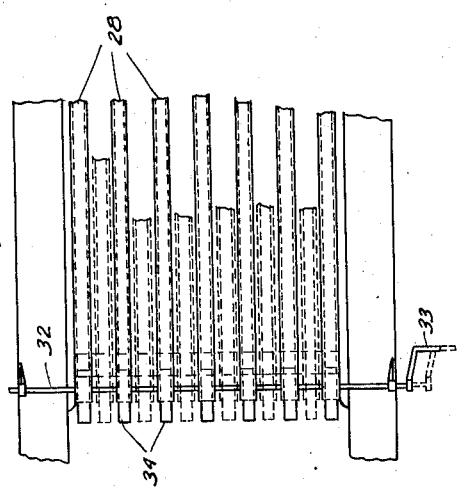

Patented Nov. 27, 1934

1,982,477

UNITED STATES PATENT OFFICE 1,982,477

APPARATUS FOR ANNEALING GLASSWARE

William A. Morton, Pittsburgh, and Paul L. Geer, Bellevue, Pa., assignors to Amco, Incorporated, Pittsburgh, Pa., a corporation of Pennsylvania Application May 4, 1934, Serial No. 723,852

2 Claims. (Cl. 49—47)

This invention relates to a method of and an apparatus for annealing glassware and the like, and particularly to that class of inventions in which the glassware is passed through an elongated chamber or tunnel, by means of a conveyor, the temperature of the chamber or tunnel through which the ware is passed being regulated to produce the proper annealing.

The present application is a continuation in part of an application serially numbered 182,548 filed by us April 11, 1927.

It is well understood that glassware, after being shaped in a forming machine, must be annealed. The annealing operation as now generally practiced consists in passing the ware on a conveyor through a tunnel having a relatively high temperature at its entrance end and having a gradually decreasing temperature therein towards its discharge end.

As heretofore generally followed, it has been the practice to discharge the glassware from the forming machine onto a table, and then have operators carry the ware to the receiving end of the conveyor, designed to convey the ware through the leer or to a ware-feeding device located near the receiving end of the leer. This method of operation causes the ware to cool, during the time required to carry it from the forming machine to the leer conveyor, to such a degree that the ware must be re-heated to a temperature equal to the temperature of the ware as it leaves the forming machine. This method is not only wasteful in the amount of fuel required to reheat, but is detrimental to the ware being treated, creating stresses in the ware and causing breakage.

In the application above referred to, one of the main objects was to provide a new and improved method of annealing that will maintain the articles to be annealed at approximately the same temperature as they leave the forming machine for a sufficient length of time to prevent the creation of stresses, and then to uniformly cool the articles. This object is also accomplished in the present invention and is carried out by transferring the glassware from the forming machine by means of a ware conveyor arranged to pass through a properly heated tunnel or the like, thus avoiding the cooling to which the ware has heretofore been subjected prior to its introduction into the annealing tunnel.

Our present invention, in addition to being directed to certain improvements in the features covered by the said application, contemplates a new method of and apparatus for annealing the glassware as it is conveyed through the main tunnel of the leer.

Among the objects of our invention are, to provide a method of annealing that will produce more satisfactory annealing of the glassware and at a considerable saving in cost than other methods heretofore followed.

Further objects are, the provision of an independent main heating flue, for conveying the heated gases or the heating medium from the combustion chamber, located within the main tunnel of the leer but unattached to the walls of the tunnel to permit an independent expansion and contraction thereof; and to provide in connection with said flue, means for withdrawing a quantity or volume of the heating medium therefrom at a predetermined point in the flue.

Other objects of our invention will be disclosed or become apparent from a consideration of the description following in connection with the accompanying drawings.

Figure 9:
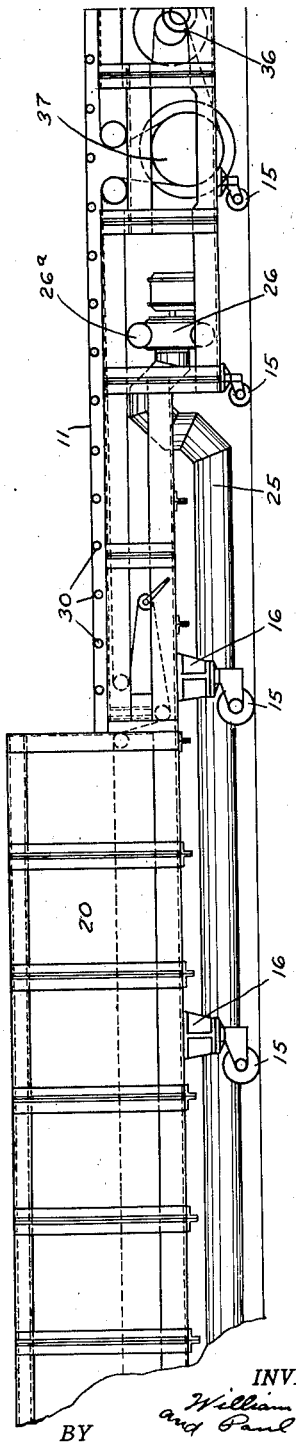

In the accompanying drawings, which illustrate an embodiment of our invention:

Fig. 1 is a horizontal sectional view, particularly showing the forward or receiving end of the leer and the transfer chamber interposed between the main leer tunnel and the auxiliary tunnel;

Fig. 2, a vertical longitudinal sectional view, the section being taken on line II—II of Fig. 1;

Fig. 3, a view similar to Fig. 2, the section being taken on line III—III of Fig. 1;

Fig. 4, a cross-sectional view taken on line IV—IV of Fig. 3;

Fig. 5 a vertical sectional view taken on line V—V of Fig. 1;

Fig. 6 a part longitudinal sectional and a part elevational view, particularly showing a portion of the leer rearwardly of the corresponding sectional view of Fig. 3;

Fig. 7 a side elevational view, showing the portion of the leer shown in Fig. 6;

Fig. 8 a part sectional and a part elevational view particularly showing the rear portion of the leer structure and the conveyor driving mechanism;

Fig. 9 a side elevational view of that portion of the leer shown by Fig. 8;

Fig. 10 a detail vertical sectional view taken on line X—X of Fig. 6;

Fig. 11, a detail horizontal section taken on line XI—XI of Fig. 6;

Fig. 12 a detail plan showing a portion of the conveyor supporting bars and means for adjusting the ends thereof laterally with respect to the leer; and Fig. 13, a detail longitudinal view of a modified construction omitting the auxiliary tunnel.

As illustrated and as preferred, the leer construction includes a feeding-in or auxiliary tunnel 5, a main tunnel 6, and an intermediately disposed ware transfer chamber 7. Tunnel 5 is designed to be positioned adjacent a ware forming machine, not shown, and to contain a feeding-in ware conveyor 8, upon which the glassware is conveyed through tunnel 5 and passed onto a ware transfer mechanism including a revoluble member 9 carried on a rotatable vertically extending shaft 10. The transfer mechanism is located in chamber 7 and is designed to transfer the glassware from the conveyor 8 to a main ware conveyor 11 operable in the main tunnel 6. The construction and parts just described are similar to the construction and parts shown in the co-pending application above referred to, and, it is believed, that it is not necessary to further describe these parts nor the means for operating them.

Each of the tunnels may be heated from a common firebox or combustion chamber indicated by the numeral 12, or a separate combustion chamber may be provided for the tunnel 5.

When a single combustion chamber is employed, flues leading from the combustion chamber to the tunnel 5 may be provided; a transversely extending header 13 in open communication with the combustion chamber being employed for passing the products of combustion or the heating medium from the combustion chamber to a main heating flue 14.

The annealing leer structure as a whole is designed to be mounted on rollers or wheels, so that it may be moved into the desired operative position in the plant relative to glass making apparatus employed. As shown, we have provided rollers 15 carried by structural members 16, the latter extending under the leer and entering into the metallic framework employed in the leer construction. The bottom, side and end walls of the leer structure, indicated generally by the numerals 17, 18 and 19, are formed of suitable brick or furnace material, and may be of any preferred construction, said walls being preferably covered by a metallic sheeting 20.

The top wall or roof of the structure preferably includes metallic sheet material 21, suitable structural steel members 22, and a mass of some suitable heat retaining material indicated by 23.

The ware conveyor 11 of an endless belt type is perforated, shown by the numeral 11a, Figure 1 to expose a maximum portion of the bottom wall 17 and flue 14 to the ware and is disposed in the leer a considerable distance above the bottom wall or floor 17 thereof to form a temperature equalizing chamber for diffusing the ascending convection currents before passing through the conveyor and around the ware. The main heating flue 14 extends under both strands or flights of the conveyor from the header 13, located in the combustion chamber beyond the critical annealing range, to a desired point located towards the discharge end of the main tunnel 6, see Fig. 8. Attention is called to the fact that the heating flue 14 is entirely independent of the furnace walls, thus allowing for an independent expansion and contraction thereof.

For the purpose of withdrawing desired quantities of the heating medium from the main flue 14, in order to aid in controlling the heat temperature of the tunnel, we provide a series of depending flues or passages 24 in communication with the said flue and with a pipe 25 leading from an exhaust fan 26. Dampers 27 are provided in flues 24. Exhaust fan 26 is also designed to draw the heating medium or heated gases through flue 14, and 26a designates an exhaust pipe through which the spent heated gases are discharged.

While any suitable means may be employed for supporting the ware carrying strand of the endless conveyor 11, as well as return strand, we have provided for this purpose a series of longitudinally extending members in the form of channels 28 and a series of transverse members 29, the latter extending across the tunnel and supported in the side walls thereof, a series of rollers 30 for the upper strand or flight, and a series of rollers 31 for the return strand of the conveyor. At the ware receiving end of the conveyor, means are provided for imparting a slight transverse horizontal or shifting movement to the supporting members 28 for the purpose of distributing the ware on the conveyor. These means are particularly shown by the detail view, Fig. 12, and, as illustrated, they include a threaded shaft 32 having an operating handle 33 and a plurality of members 34 mounted thereon. By providing the means for shifting or changing the position of the supports 28, it will be apparent that the contacting portions of the conveyor therewith will be altered, thus preventing contact and wear always in the same lines.

The conveyor 11 is driven by suitable means of the usual or any preferred type located near the discharge end of the tunnel. We have illustrated diagrammatically in Figs. 8 and 9 suitable driving mechanism 36, said mechanism also including a take-up mechanism 37 for the conveyor located at one side of the drive pulley of mechanism 36.

After the air of the tunnel is heated, a pressure differential exists as between the roof and the floor of the tunnel, positive at the top and negative below, causing the heated air to flow from the upper portions of the tunnel and cold air to flow in adjacent the floor under the ware being annealed. If the ware bearing strand were adjacent the floor, unsatisfactory annealing of the articles would result. By spacing this strand a substantial distance from the floor, the convection currents are diffused so that the cold air will not contact the ware.

The construction illustrated, and our invention provides for, heated air zones, varying in temperature, that entirely surround the glass articles being annealed, thus insuring an effective and satisfactory annealing of the articles, due to the rapid equalization of temperature throughout the articles being annealed.

In the modified form of our invention shown by Fig. 13, we omit the ware feeding-in or auxiliary tunnel 5 and employ a construction in which the ware is introduced to the main tunnel 6, by any suitable means not shown, through a door controlled opening formed in the front wall 19a of the leer. It is evident that the ware may be introduced from the side of the receiving end of the leer as well as through the front wall, as shown by Fig. 13.

We claim:

1. A leer structure comprising bottom, top and side walls constituting a muffle chamber, an endless conveyor having its ware bearing strand disposed within said chamber, heating means adjacent the bottom wall of said chamber to produce ascending convection currents within said chamber, regulating means controlling the temperature longitudinally of said chamber, and spaced supporting members below the ware bearing strand of the conveyor constituting baffles to prevent continuous movement of air currents adjacent the conveyor, said conveyor comprising a perforated ware bearing member exposing a maximum portion of the base of the ware to the bottom wall of the chamber, and the ware bearing portion of said conveyor being spaced a sufficient distance above the bottom wall to form a temperature equalizing chamber below and coextensive with said conveyor and heating means in which convection currents moving forward in the tunnel longitudinally beneath the conveyor are heated and diffused before passing through the perforated strand to envelope the ware.

2. In a leer for annealing glassware, an annealing tunnel comprising a muffle chamber, heating means extending longitudinally at the bottom of the tunnel, an endless perforate ware conveyor having its ware bearing strand spaced a sufficient distance above the heating means to diffuse the heated air passing from the rear of the tunnel and rising below the conveyor strand, and means for regulating the heating means longitudinally of the tunnel for progressively increasing the intensity of the rising convection currents from the rear toward the front of the muffle chamber.

WILLIAM A. MORTON.
PAUL L. GEER.